(12) United States Patent
Kerr, Jr.

(10) Patent No.: US 8,616,513 B2
(45) Date of Patent: Dec. 31, 2013

(54) BRACKET HAVING OVERHANGING SUPPORT ELEMENTS FOR SUPPORTING AN ELECTRICAL BOX

(76) Inventor: Jack Kerr, Jr., College Station, TX (US)

( * ) Notice: Subject to any disclaimer, the term of this patent is extended or adjusted under 35 U.S.C. 154(b) by 1 day.

(21) Appl. No.: 13/191,406

(22) Filed: Jul. 26, 2011

(65) Prior Publication Data

US 2012/0018604 A1    Jan. 26, 2012

Related U.S. Application Data

(60) Provisional application No. 61/367,523, filed on Jul. 26, 2010.

(51) Int. Cl.
*B42F 13/00* (2006.01)

(52) U.S. Cl.
USPC ............ 248/340; 248/200.1; 248/205.1; 248/201; 248/343

(58) Field of Classification Search
USPC ........... 248/200, 201, 200.1, 205.1, 906, 304, 248/307, 327, 339, 340, 343
See application file for complete search history.

(56) References Cited

U.S. PATENT DOCUMENTS

| | | | | |
|---|---|---|---|---|
| 2,375,513 A | * | 5/1945 | Bach | 248/59 |
| 2,732,162 A | * | 1/1956 | McKinley | 248/343 |
| 2,967,040 A | * | 1/1961 | Picha | 248/324 |
| 3,597,889 A | * | 8/1971 | Lo Nigro | 52/28 |
| 4,717,099 A | * | 1/1988 | Hubbard | 248/57 |
| 5,934,631 A | * | 8/1999 | Becker et al. | 248/200.1 |
| 7,472,875 B2 | * | 1/2009 | Rinderer | 248/200.1 |
| 7,784,746 B2 | * | 8/2010 | Kafenshtok et al. | 248/75 |
| 8,057,077 B2 | * | 11/2011 | Gagne et al. | 362/404 |
| 8,109,482 B2 | * | 2/2012 | Oh | 248/342 |
| 2005/0067545 A1 | * | 3/2005 | Coble et al. | 248/343 |

* cited by examiner

*Primary Examiner* — Nkeisha Smith
(74) *Attorney, Agent, or Firm* — Michael Diaz

(57) ABSTRACT

A bracket for supporting a load from a mounting assembly. The bracket includes an upper portion having a support element and a lower portion having a mount for coupling the load to the bracket. The bracket also includes at least two side supports coupled to the support element and the mount located on sides of the mounting assembly. The upper portion, lower portion and side supports of the bracket are sized and shaped to fit over a perimeter of the support element. In one embodiment, the support arms are two support arms spaced across a length of the bracket to spread a load on the bracket.

13 Claims, 6 Drawing Sheets

BRACKET HAVING OVERHANGING SUPPORT ELEMENTS FOR SUPPORTING AN ELECTRICAL BOX

RELATED APPLICATIONS

This utility application claims the benefit of U.S. Provisional Patent Application Ser. No. 61/367,523 filed Jul. 26, 2010 by Jack R. Kerr, Jr., which is hereby incorporated by reference.

BACKGROUND OF THE INVENTION

1. Field of the Invention

This invention relates to support assemblies. Specifically, and not by way of limitation, the present invention relates to a bracket having overhanging support elements for supporting an electrical box.

2. Description of the Related Art

In construction of houses and buildings, it is quite common to have electrical boxes mounted to the walls or ceilings. These electrical boxes provide support and storage of various wiring devices, lighting fixtures, fans, and many other devices useful in a building. Electrical boxes also provide a space for electrical connections between the wiring device or fixture and the wiring of the building. These electrical boxes are normally attached to one or more structural supports, such as joists or studs. Often the electrical boxes include brackets for directly attaching the electrical box to the support member, while other electrical boxes are attached to a hanger or other support assembly which extends between a pair of adjacent structural supports.

There are various mounting assemblies which are currently used for supporting ceiling fans or other fixtures between a pair of structural supports. These assemblies are usually attached to the ceiling joists by a brace, a bar hanger or other suitable member extending between the joist. FIG. 1 is a bottom perspective view of an existing mounting assembly 10. The mounting assembly includes two elongated members 12 and 14 interconnected in such a manner as to telescopically extend. The elongated members include end mounts 16 and 18 located on opposing ends of the mounting assembly. The end mounts 16 and 18 typically extend perpendicular to the elongated members. An electrical box 20 is slidably attached to a bottom side 22 of the elongated members with a bracket 30. The bracket rests upon opposing lips 32 and 34. Between the lips is a longitudinally aligned slot 36.

The elongated members are expanded to engage adjacent structural supports or joists (not shown). The elongated members are expanded until the end mounts 16 and 18 frictionally engage the structural supports or ceiling joists. Other mounting braces may also include sharp prongs or teeth which are driven into the joists by force.

FIG. 2 is a top perspective view of the bracket 30 attached to the mounting assembly 10 of FIG. 1. FIG. 3 is a side view of the bracket 30 held within the mounting assembly of FIG. 1. The bracket includes edges 40 and 42 to lie within the slot 36 of the mounting assembly 10. The lips 32 and 34 bear the full weight of the bracket and electrical box 20. In one embodiment, one or more screws 50 are affixed to the bracket 30 and the electrical box 20. This embodiment provides a secure mechanism for attaching an electrical box to the mounting assembly. However, this bracket suffers from several disadvantages. Because the bracket is supported by the lips 32 and 34, the greatest stress is placed on the lips which are not the strongest portion of the mounting assembly. Because of the inherent weakness of the lips, the lips have a tendency to bend outwardly from each other when supporting a heavy weight for an extended period of time. In such a situation, when bearing heavy weights, the bracket deforms the mounting assembly a sufficient amount to cause the bracket to fall out of an interior 52 of the mounting assembly or to significantly weaken the structural integrity of the mounting assembly. Thus, the bracket reduces the weight which can be safely be supported by the bracket.

Therefore, it would be advantageous to have a mounting assembly having a bracket which bears weight in an area of the mounting assembly which is able to support greater weights. It is an object of the present invention to provide such an apparatus.

SUMMARY OF THE INVENTION

In one aspect, the present invention is directed to a bracket for supporting a load from a mounting assembly. The bracket includes an upper portion having a support element and a lower portion having a mount for coupling the load to the bracket. The bracket also includes at least two side supports coupled to the support element and the mount located on sides of the mounting assembly. The upper portion, lower portion and side supports of the bracket are sized and shaped to fit over a perimeter of the support element. In one embodiment, the support arms are two support arms spaced across a length of the bracket to spread a load on the bracket.

In another aspect, the present invention is directed to a mounting assembly for supporting an electrical box between two supports. The mounting assembly includes a first elongated member having an end mount on a first end. The first elongated member has a hollow interior and a perimeter on a second end. The mounting assembly also includes a second elongated member having an end mount on a first end. The second elongated member has a hollow interior and a perimeter on a second end sized and shaped to receive the second end of the first elongated member. The first and second elongated members are slidably coupled to enable telescopic extension of the mounting assembly. The mounting assembly also includes an upper portion having a support element and a lower portion having a mount for coupling the load to the bracket. The bracket also includes at least two side supports coupled to the support element and the mount located on sides of the mounting assembly. The upper portion, lower portion and side supports of the bracket are sized and shaped to fit over a perimeter of the support element. In one embodiment, the support arms are two support arms spaced across a length of the bracket to spread a load on the bracket.

DESCRIPTION OF THE INVENTION

Figure 1:
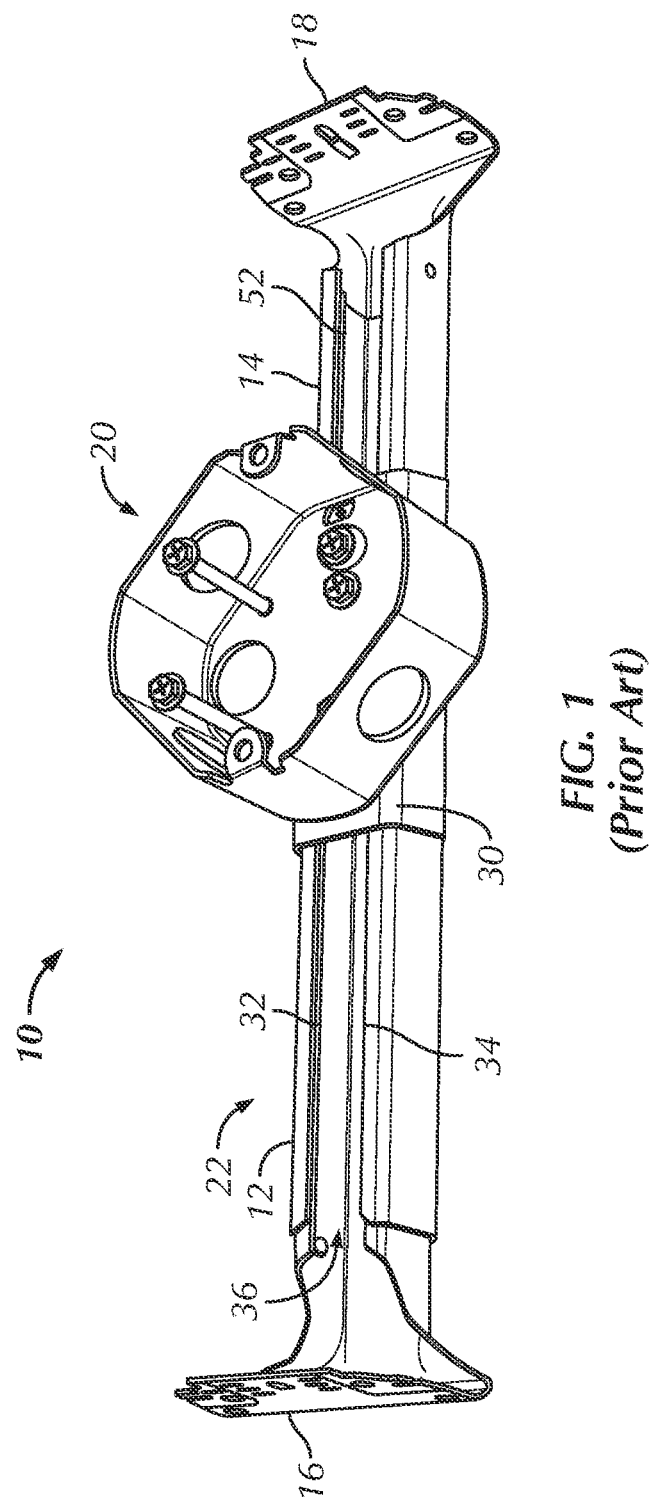
FIG. 1 (prior art) is a bottom perspective view of an existing mounting assembly.
Figure 2:
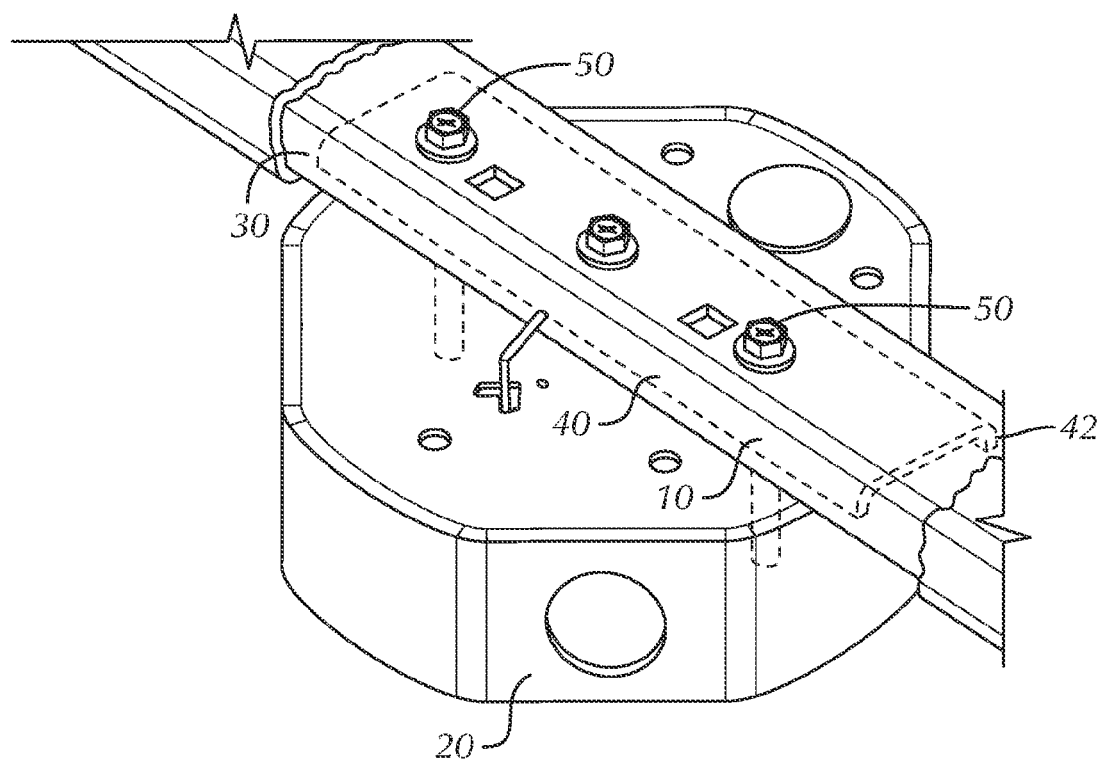
FIG. 2 (prior art) is a top perspective view of the bracket attached to the mounting assembly of FIG. 1.
Figure 3:
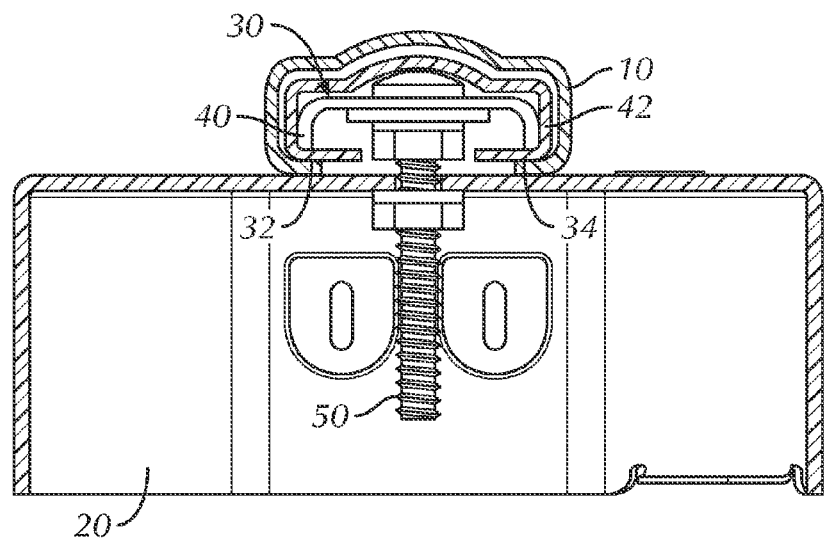
FIG. 3 (prior art) is a side view of the bracket held within the mounting assembly of FIG. 1.
Figure 4:
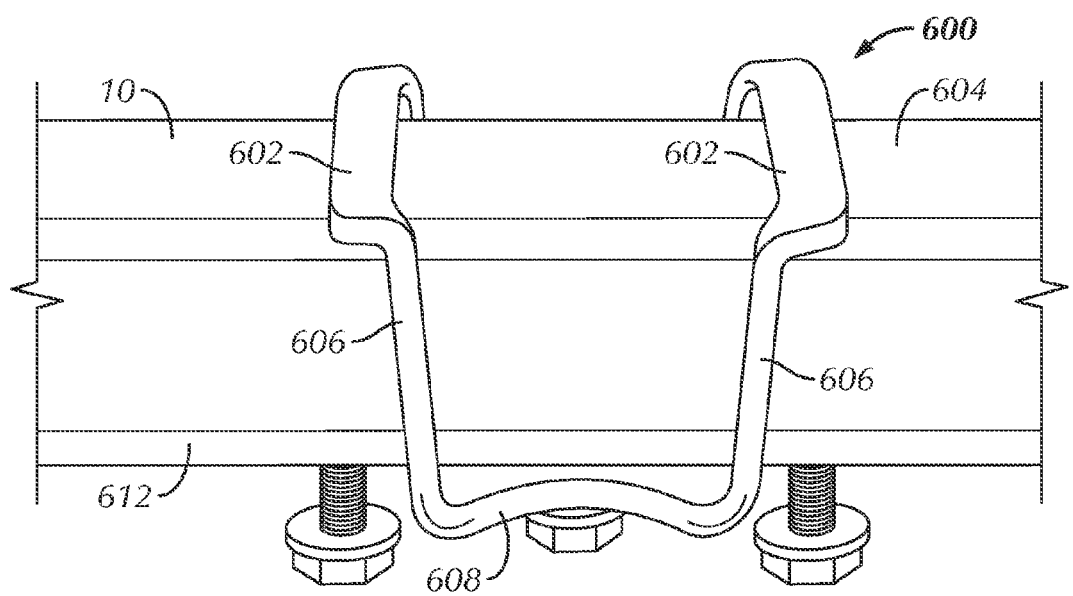
FIG. 4 is a side view of an electrical box bracket in one embodiment of the present invention.

The present invention is a bracket having overhanging support elements for supporting an electrical box attached to a mounting assembly. FIG. 4 is a side view of an electrical box bracket 600 in one embodiment of the present invention. The electrical box bracket 600 enables an electrical box (not shown) to be attached or loaded on any mounting assembly, such as the mounting assembly 10. The bracket 600 includes two upper support elements 602 (lying on a top side 604 of the mounting assembly 100). The support elements run the width of the elongated arms 12 and 14 of the mounting assembly and are spaced apart from each other a length of the bracket to spread a load held by the bracket on an upper side of the mounting assembly. The support elements include four side supports 606. The side supports run substantially vertically from the upper support elements 602 down to a mount 608. The mount 608 is located on a bottom side 612 of the mounting assembly. The bracket is sized and shaped to fit over a perimeter of the mounting assembly 10.

Figure 5:
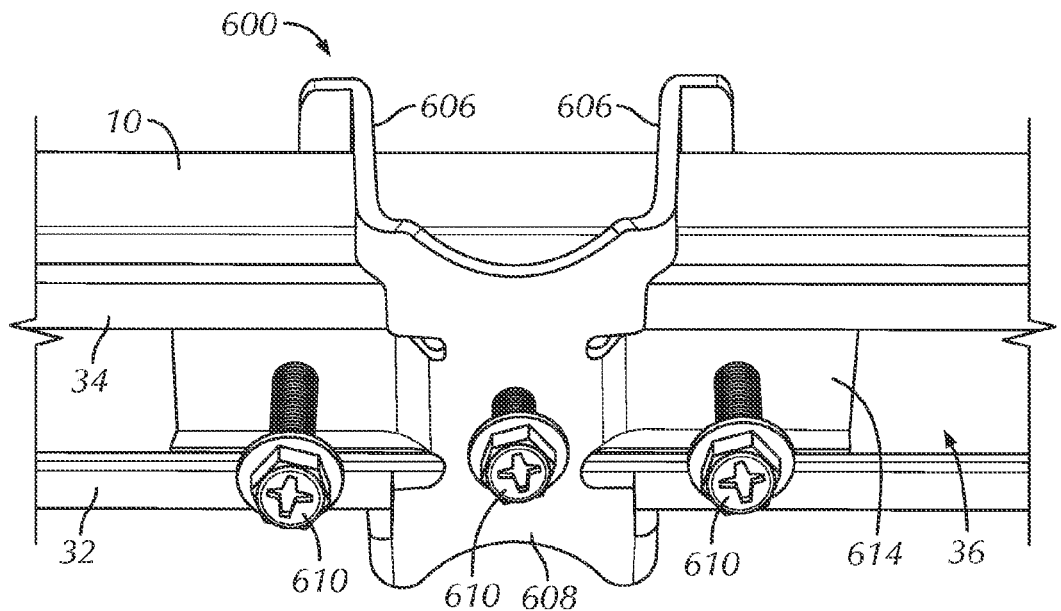
FIG. 5 is a bottom perspective view of the bracket of FIG. 4.
Figure 6:
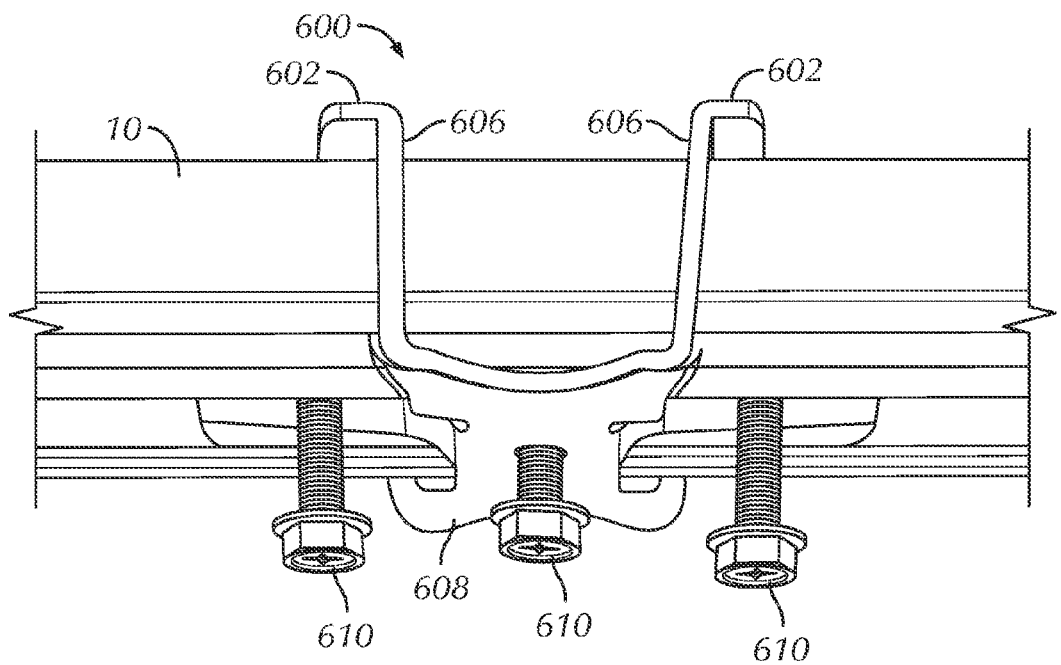
FIG. 6 is a side view of the bracket of FIG. 4.
Figure 7:
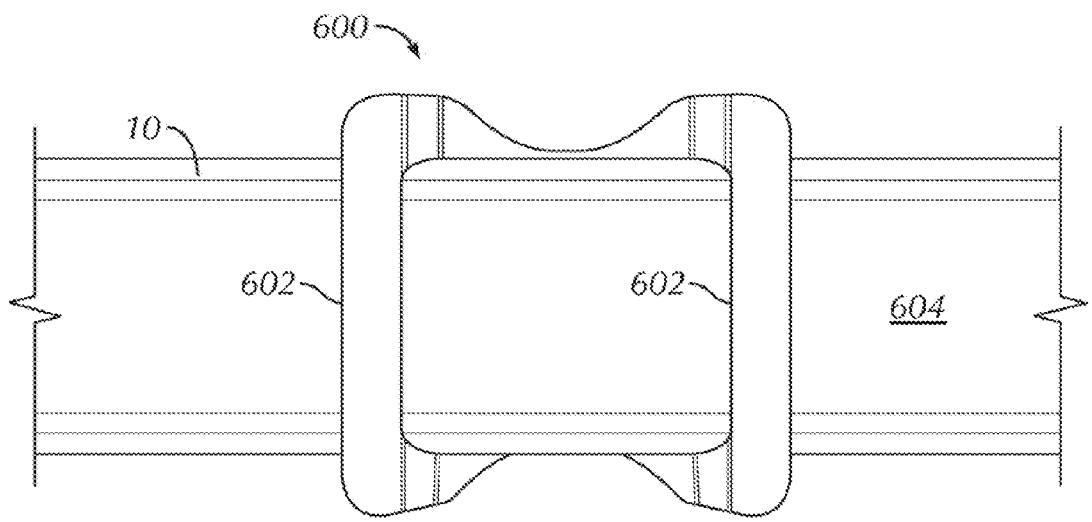
FIG. 7 is a top view of the bracket illustrating the support elements.
Figure 8:
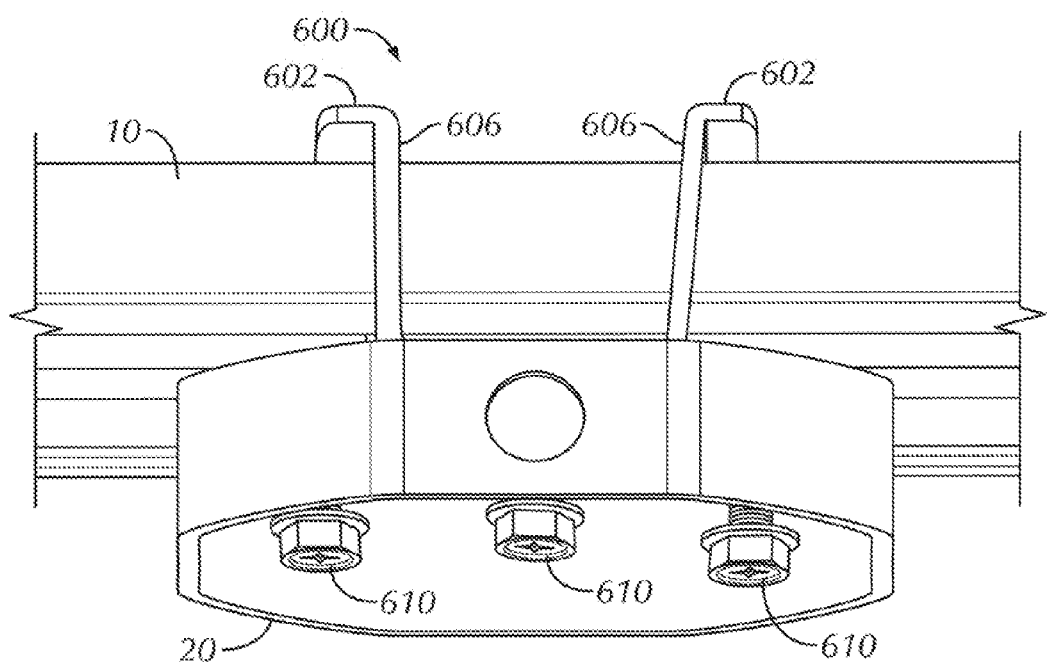
FIG. 8 is a side view of the bracket with the electric box.

FIG. 5 is a bottom perspective view of the bracket 600 of FIG. 4. The mount 608 includes a plurality of screws 610 for affixing an electrical box (not shown) to the bracket. The mount includes a longitudinal section 614 positioned within the open slot 36. The longitudinal section 614 is affixed to a top portion of the mount 608 and is sized and shaped to rest upon the lips 32 and 34 of the mounting assembly. As illustrated in FIG. 5, the middle 610 affixes the longitudinal section to the bracket 600. The outer screws 610 are affixed directly to the longitudinal section. FIG. 6 is a side view of the bracket 600. FIG. 7 is a top view of the bracket illustrating the support elements 602. FIG. 8 is a side view of the bracket with the electric box 20.

With reference to FIGS. 4-7, the operation of the bracket 600 will now be explained. The bracket 600 is positioned upon the mounting assembly 10. The upper support elements 602 are located on the top side 604 of the mounting assembly. The four side supports 606 lie on the sides of the mounting assembly. The longitudinal section 610 is positioned within the slot 36 of the mounting assembly with sides of the longitudinal section resting upon the lips 32 and 34 of the mounting assembly. An electrical box (not shown) is affixed to the bracket by fasteners, such as the screws 610. With the electrical box attached to the bracket, the bracket supports the electrical box upon the mounting assembly using the upper support elements 602 to support a substantial portion of the weight. In addition, the longitudinal section may support weight on the lips 32 and 34 of the mounting assembly. Thus, the bracket supports the electrical box by using the strongest portion of the mounting assembly, specifically the main body of the mounting assembly.

Figure 9:
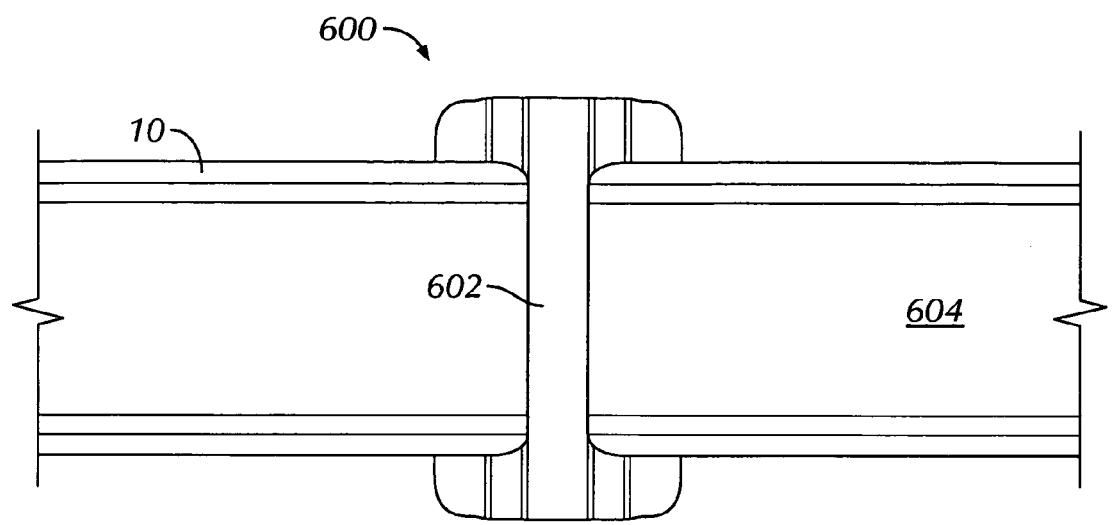
FIG. 9 is a top view of the bracket illustrating the support bracket having a single support element.
Figure 10:
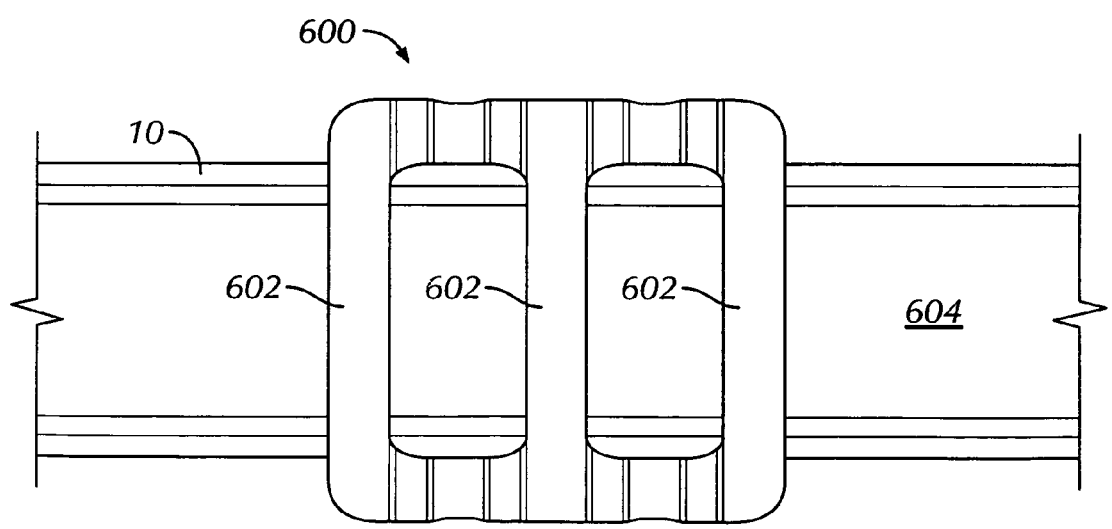
FIG. 10 is a top view of the bracket illustrating the support bracket having a three support elements.

The present invention is not limited to two upper elements. The present invention may include a solid single upper element (see FIG. 9) or may include more than two upper support elements 602 (see FIG. 10). In addition, the bracket may or may not include the longitudinal section 612. Furthermore, the side supports 606 may be more than four or be a solid single support located on each side of the element and coupled to the upper support elements 602 and the mount 608.

The present invention provides many advantages over existing brackets used on mounting assemblies. The present invention is a bracket which utilizes the strongest portion of the mounting assembly to support a weight. In addition, by utilizing two upper support elements, the load is spread across a length of the bracket and mounting assembly. Furthermore, the present invention is easily attached to the mounting assembly by sliding the bracket onto the main body of the mounting assembly.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A bracket and mounting assembly combination for supporting a load from the mounting assembly, the combination comprising:
    a mounting assembly:
    the bracket comprising: an upper portion having a at least one support element positioned on top of the mounting assembly;
    a lower portion having a mount for coupling the load to the bracket; and
    at least two side supports coupled to the at least one support element; wherein the at least two side supports extend vertically upward from the lower portion of the bracket along a side of the mounting assembly to the at least one support element;
    wherein the load is an electrical box,
    wherein the mount includes a recessed longitudinal support having two sides positioned in a slat of the mounting assembly;
    wherein the upper portion, lower portion and side supports are sized and shaped to fit over a perimeter of the mounting assembly.

2. The bracket and mounting assembly combination according to claim 1 wherein the support element is two support elements spaced along a length of the bracket, thereby spreading a load upon an upper side of the mounting assembly.

3. The bracket and mounting assembly combination according to claim 1 wherein the support element includes more than two support elements.

4. The bracket and mounting assembly combination according to claim 1 wherein the mount includes a screw to couple the electrical box to the mount.

5. The bracket and mounting assembly combination according to claim 1 wherein the two sides of the longitudinal support are is supported within the slot by lips of the mounting assembly.

6. The bracket and mounting assembly combination according to claim 5 wherein the longitudinal support includes a first screw to affix the mount to the electrical box and a second screw to affix the longitudinal support to the mount.

7. The bracket and mounting assembly combination according to claim 1 wherein the side support are four side supports located on two sides side of the mounting assembly.

8. A bracket and mounting assembly combination for supporting an electrical box between two supports, the combination comprising:
 a mounting assembly comprising:
  a first elongated member having an end mount on a first end, the first elongated member having a hollow interior and a perimeter on a second end;
  a second elongated member having an end mount on a first end, the second elongated member having a hollow interior and a perimeter on a second end sized and shaped to receive the second end of the first elongated member;
 wherein the first and second elongated members are slidably coupled to enable telescopic extension of the mounting assembly; and
 a bracket for supporting a load from the mounting assembly, the bracket comprising:
  an upper portion having a at least one support element;
  positioned on top of the mounting assembly;
  a lower portion having a mount for coupling the load to the bracket; and
  at least two side supports coupled to the at least one support element;
  wherein the at least two side supports extend vertically upward from the lower portion of the bracket along a side of the mounting assembly to the at least one support element;
  wherein the upper portion, lower portion and side supports are sized and shaped to fit over a perimeter of the mounting assembly;
  wherein the load is an electrical box;
  wherein the mount includes a recessed longitudinal support having two sides positioned in a slot of the mounting assembly.

9. The bracket and mounting assembly combination according to claim 8 wherein the support element of the bracket is two support elements spaced along a length of the bracket, thereby spreading a load upon an upper side of the mounting assembly.

10. The bracket and mounting assembly combination according to claim 8 wherein the support element includes more than two support elements.

11. The bracket and mounting assembly combination according to claim 9 wherein the mount includes a screw to couple the electrical box to the mount.

12. The bracket and mounting assembly combination according to claim 9 wherein:
 the mounting assembly includes lips and a slot; and
 the two sides of the longitudinal support are supported within the slot by the lips of the mounting assembly.

13. The bracket and mounting assembly combination according to claim 12 wherein the longitudinal support includes a first screw to affix the mount to the electrical box and a second screw to affix the longitudinal support to the mount.

* * * * *